United States Patent [19]

Northrup, Jr.

[11] Patent Number: 4,962,695
[45] Date of Patent: Oct. 16, 1990

[54] BROILER OVEN

[76] Inventor: Lynn L. Northrup, Jr., 1750 Americas Tower, 2323 Bryan LB 174, Dallas, Tex. 75201

[21] Appl. No.: 224,736

[22] Filed: Jul. 27, 1988

[51] Int. Cl.$^5$ ............................................. A47J 37/00
[52] U.S. Cl. ........................................ 99/339; 99/373;
99/386; 99/427; 99/443 C
[58] Field of Search ................ 99/443 C, 443 R, 345,
99/373, 386, 390, 391, 395, 396, 422, 423, 425,
444, 447, 448, 339, 427; 126/41 R, 41 C;
219/388; 426/523

[56] References Cited

U.S. PATENT DOCUMENTS

| | | | |
|---|---|---|---|
| 1,618,587 | 2/1927 | Grady | 99/427 |
| 1,771,762 | 7/1930 | Allwine | 99/427 |
| 1,773,109 | 8/1930 | McCaig et al. | 99/386 X |
| 2,705,913 | 4/1955 | Bloom | 99/386 X |
| 3,456,578 | 7/1969 | Pinsly | 99/339 |
| 3,721,178 | 3/1973 | Szabrak et al. | 99/391 X |
| 3,770,408 | 11/1973 | McCully | 219/400 |
| 3,815,489 | 6/1974 | Reid, Jr. et al. | 99/386 X |
| 4,421,015 | 12/1983 | Masters et al. | 99/339 X |
| 4,568,552 | 2/1986 | Persson | 99/386 X |

Primary Examiner—Timothy F. Simone
Attorney, Agent, or Firm—James O. Dixon

[57] ABSTRACT

An improved method of cooking and an improved broiler/oven that provides different levels of heat to cook meats or the like at a relatively high heat condition and toast buns or the like, at a relatively lower heat condition. Trays are moved from the front of the oven to the rear at an upper level within the oven and are then lowered and re-directed back toward the front at a lower level while retaining their face-up condition. Heaters are positioned between the two levels such that objects on the trays are heated on one side while being transported toward the rear of the oven and are heated on the other side while being returned to the front.

11 Claims, 3 Drawing Sheets

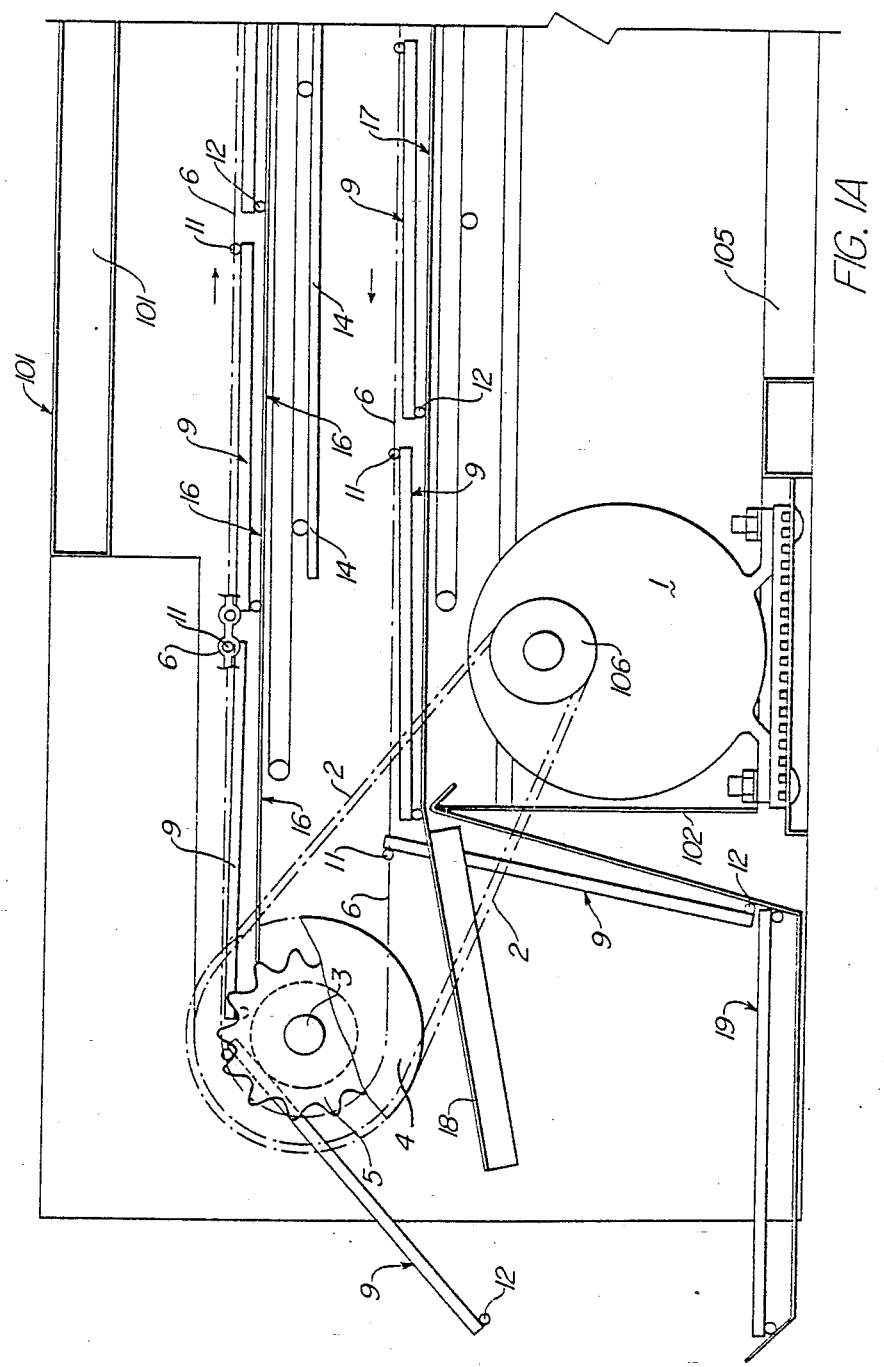

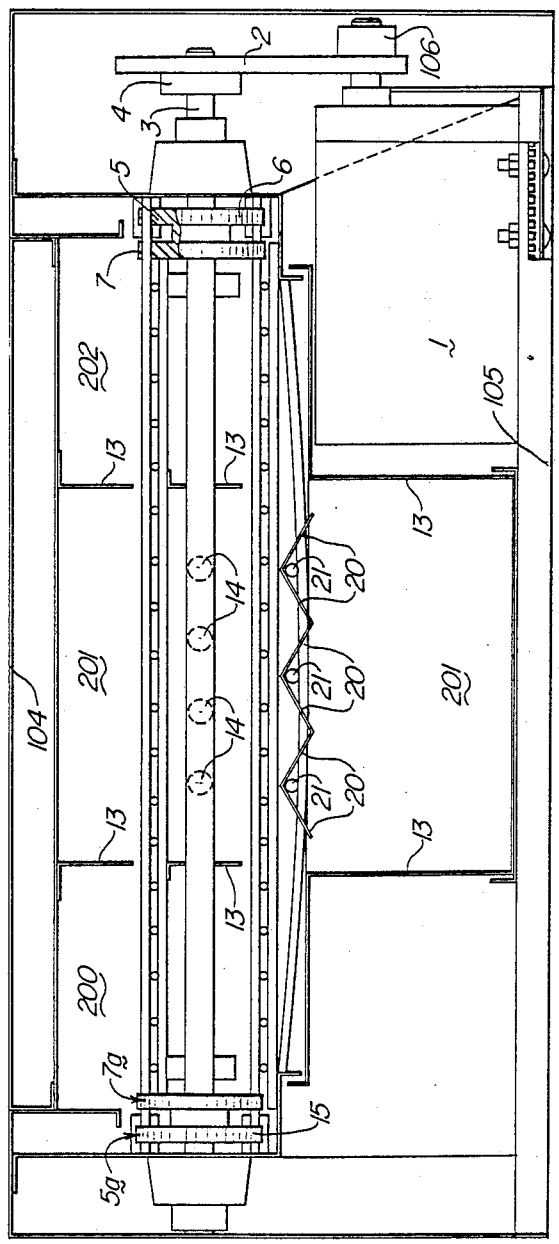
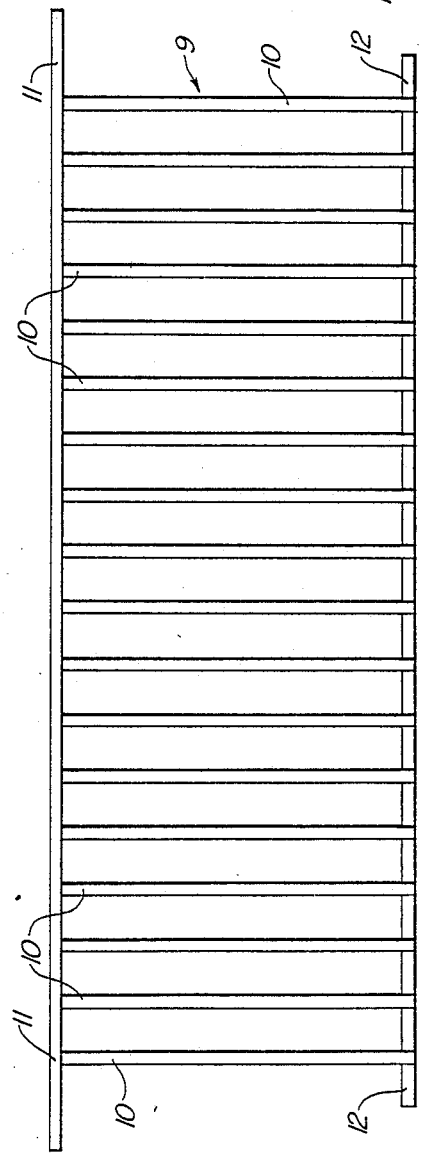

BROILER OVEN

BACKGROUND OF THE INVENTION

This invention relates to improved ovens and more particularly to such ovens that are adapted for simultaneously broiling one class of items such as hamburgers while applying lesser heat to another class of items such as hamburger buns.

As is well known to those skilled in the art, there are many applications in which it is desirable to simultaneously apply differing levels of heat to edible items while they are being processed. These include items such as hot dogs and hamburgers in which a meat item is heated and cooked, while at the same time the associated bun is warmed and/or toasted.

Many ovens have been proposed for carrying out the foregoing, among them being those identified in K. G. Hatch U.S. Pat. No. 3,400,651 on Sept. 10, 1968, E. D. Baker 3,580,164 on May 25, 1971, R. L. Duning 3,739,712 on June 19, 1973, E. A. Reid, Jr. 3,815,489 on June 11, 1974, J. S. Brown 4,023,007 on May 10, 1977, A. G. Masters 4,421,015 on Dec. 20, 1983 and K. Persson 4,568,552 on Feb. 5, 1986. As will be evident from reference to these patents, the Baker, Reid and Masters patents disclose apparatus for cooking burger patties and heating buns simultaneously in the same cooking device. In addition, Reid discloses the use of "spillover" heat from the burners of the patty cooker to heat toast the associated buns in a separate cooking tunnel. Moreover, the Masters, Hatch and Brown patents disclose electric cooking; Hatch and Masters show feed and delivery of the product at the same end of the oven; and Brown discloses heat reflector baffles on which grease drippings are allowed to fall. However, although the proposals of these patents include certain features individually or in limited combinations, and although they appear useful in a variety of cooking applications, there has nevertheless continued to be a need for an improved oven that embodies more of the most attractive features, including being adapted for mounting beneath a serving countertop, feed and delivery of both meat and bun from the front, using the same heating elements to heat both sides of the heated item without turning it over, includes provisions for individually heating simultaneously at different heat levels three items, and provides for firing of fat drippings in order to impart to the meat product a desirable smoked flavor.

BRIEF SUMMARY OF THE INVENTION

The improved oven of this invention provides in one piece of equipment, adaptability for mounting beneath a working countertop, provides for both feed and delivery of the heated or cooked items from the front, embodies an improved method of cooking in that it uses the same heating elements to heat both sides of the heated item, one side at a time, without turning the item over (maintaining its position relative to gravity), thereby achieving economy in the use of heat, provides for individually heating three items differently, and provides for firing or charring of the fat drippings in order to impart to the meat product(s) a desirable smoked flavor.

OBJECTS AND FEATURES

It is one general object of this invention to improve ovens.

It is another object of this invention to facilitate use of versatile ovens in various applications.

It is yet another object of this invention to provide economy in heat use.

It is still another object of this invention to facilitate introducing or removing the item to be heated.

It is another object of this invention to cook both sides of an object, one side at a time, with the same heating element and without turning the heated object over.

It is yet another object of this invention to provide optionally for smoked flavor to be imparted to the cooked item.

It is one further object of this invention to provide for individual simultaneous heating of a plurality of items.

Accordingly, in accordance with one feature of the invention, an oven housing is provided with means for conveying front-loaded items rearward while heating them on one side, and then, without turning them over, moving them forward and cooking them on the remaining side while utilizing the same heating element.

In accordance with another feature of the invention, the items to be heated are moved rearward on a plurality of individually movable carriers positioned in the upper portion of the oven housing and in a plane essentially parallel to the bottom of the housing while cooking the items on one side; and retained on the same carriers that are subsequently moved while near the rear of the oven to another plane lower than, and essentially parallel to the first plane.

In accordance with still another feature of the invention, the carriers are transported from the rear to the forward part of the oven while in the lower of the aforementioned planes.

In accordance with yet another feature of the invention, a plurality of baffles are positioned within the oven enclosure to provide partial separation of objects placed in predetermined different sections of the same moving tray, thus providing for heating the objects differently.

These and other objects and features of the invention will be apparent from the following detailed description of a preferred embodiment, with reference to the drawing in which:

BRIEF DESCRIPTION OF THE DRAWING

FIGS. 1A and 1B are partially schematic side sectional views of the preferred embodiment of the improved oven according to the invention;

FIG. 2 is a front sectional view of the oven taken along lines _—_ of FIG. 1; and FIG. 3 is a perspective view of one of the conveyor trays.

DESCRIPTION OF A PREFERRED EMBODIMENT

Figure 1B:
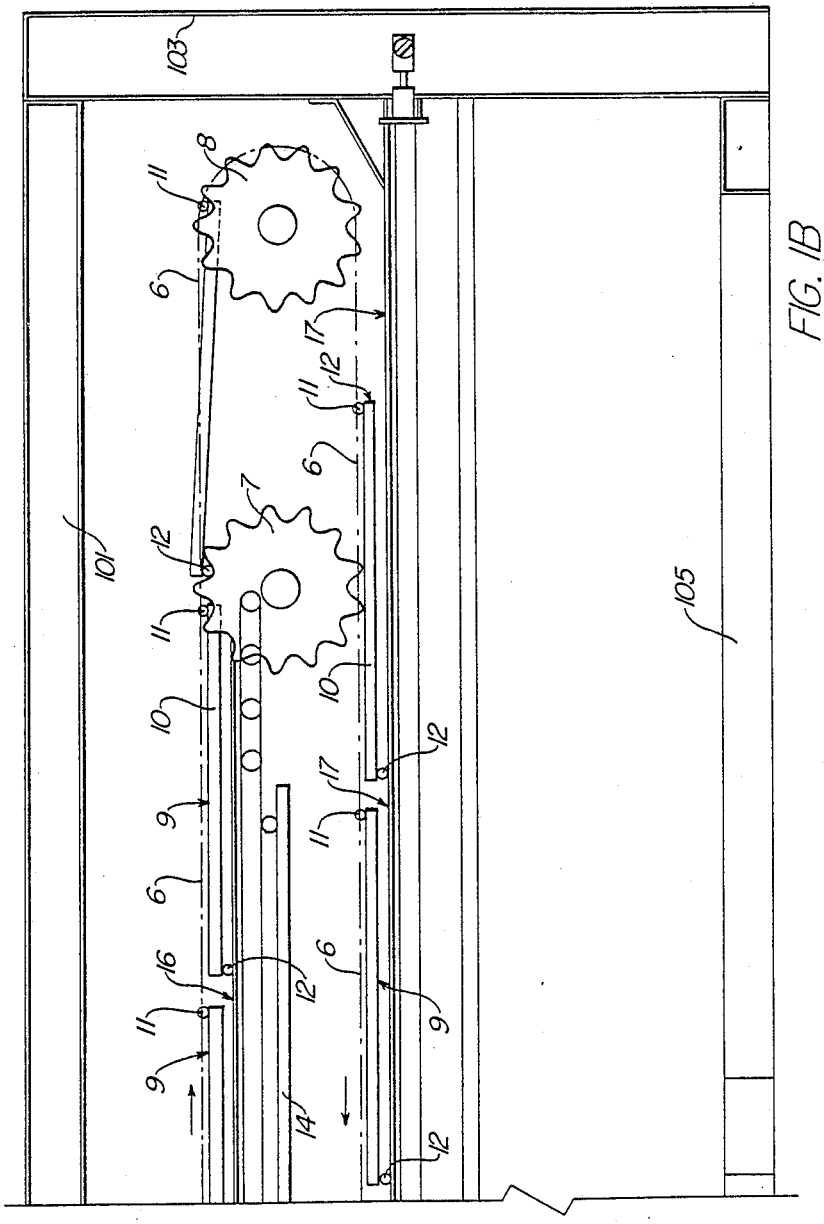

Now turning to the drawing, it will be observed that in FIGS. 1A and 1B there are depicted an oven having an exterior housing 101 with a front 102, a rear 103, a top 104 and a bottom 105. Optionally mounted in the front of the housing is a conventional oven door (not shown) which may be completely removable so as to facilitate access to the oven interior at busy times. If the oven is not to be made self-cleaning (as subsequently described), the door may be omitted entirely.

Within the housing 101 is driving motor 1 with drive shaft pulley 106 which is connected through chain or belt 2 and gear sprocket 4 to drive shaft 3. Chain sprockets 5 and 5a are mounted near opposite ends of shaft 3, and engage and drive two conveyor chains 6 and 15 which extend over dual idler sprockets 7 and 7a and around end sprockets 8 and 8a (FIG. 1). Extending between and carried by conveyor chains 6 and 15 are individual grill trays 9 (FIG. 3). Grill trays 9 are constructed of parallel rods 10 attached at one end on their upper sides to cross rod 11 and at their other ends on their undersides to cross rod 12. Cross rod 12 is shorter than cross rod 11.

Dual idler sprockets 7 and 7a are disposed such that the outer half of each such dual sprocket is in engagement with the adjacent chain 6 or 15. This prevents the dual idler sprockets from free-wheeling when the weight of a part of a tray 9 might otherwise cause it to turn unduly rapidly.

Trays 9 are carried through the broiler oven by means of the attachment or coupling of the cross rods 11 at their ends to the conveyor chains 6 and 15, while the remaining (shorter) rods 12 slide on longitudinal supports, e.g., slide support 16, 17, and 18 and corresponding slide supports on the opposite side of the oven (not shown).

As shown in FIG. 2, the broiler/oven is divided by divider walls or baffles 13 into three separate compartments 200, 201 and 202 across its width. Electrical resistance heating elements 14 are positioned in center compartment 201 between the upper and lower levels of drive chains 6 and 15. Also positioned within side compartments 200 and 202 are upper slide member 16 and lower slide member 17 and corresponding slide members on the opposite side of the oven with which ends 11 of the grill trays 9 engage for support while trays 9 are being moved from the front to the rear and from the rear to the front of the oven.

Baffles 13 do not extend completely to the front of the oven but begin at a point sufficiently spaced rearward therefrom to permit the removable placement of burger bun/patty receiving basket 19 (FIG. 1A).

Also included in the oven are optional plates 20 which are removably supported within center compartment 201 by any suitable means such as the supporting rods or auxiliary heating elements 21.

In operation, the motor 1 and electrical heating elements 14 are energized by the operation of an electrical switch (not shown), whereupon the heating elements achieve their operating cooking temperature, and the endless conveyor chains 6 and 15 begin their motion, thereby moving the series of trays 10. As will be observed, the upper level group of trays 10 is conducted to the rear by means of the motion imparted thereto through the engagement of the ends of the longer tray cross rods 11 with the chains 6 and 15; and the remaining ends of the trays are supported through sliding support provided thereto through slidable engagement of the tray shorter end rods 12 with slide supports 16, 17 and 18 and corresponding slide members on the opposite side of the oven. As soon as proper operating temperature is reached, cooking may begin. This is accomplished by placement of the meat item (e.g., hamburger patties) into central compartment 201 onto the next accessible moving tray 9. At the same time, the two halves of a corresponding bun may be placed, respectively, one on either side of the meat item on the right and left side portions of the moving tray 9 within the outer compartments 200 and 202.

As mentioned above, the trays 9 are carried to the rear of the broiler through the engagement of the cross rods 11 with the conveyor chains 6 and 15. Also, as mentioned previously, the ends of the shorter cross rods 12 ride along rail or skid 16 and its corresponding skid (not shown). As a meat item passes over the resistance heaters 14, it is broiled on its underside. At the same time, the bun halves are heated in their own compartments (200, 202) although not exposed to the direct radiation of the heaters 14.

At the rear of the oven, the cross rod 11 for each broiler tray 9 passes over dual idler sprockets 7, 7a and is carried by the conveyor chain around end sprockets 8, 8a. Sprockets 7–7a and 8–8a are spaced a tray length apart. In addition, the two inner sprockets of dual idler sprockets 7, 7a are spaced slightly closer to each other and are located between the drive chains 6 and 15 so as to catch the shorter cross rods 12 and lower them simultaneously with the lowering of cross rods 11 by the end sprockets 8 and 8a, engagement of the outer portions of dual idler sprockets 7 and 7a with the drive chains preventing free-wheeling and ensuring a smooth lowering of the rods 11. Thus, the traveling tray is lowered and its travel direction reversed with the patty and bun halves still on top of the tray. Cross rods 12 now ride on skids or rails 17 and 17a as the trays are pushed along by chains 6 and 15. On the return trip, the top side of the patty is cooked by the heater 14, while the buns continue to be warmed or heated.

As the tray travels to the front end of the broiler, cross rods 12 ride along a pair of sloped rails or skids 18 and its corresponding slide member 18a on the opposite side of the oven until they reach the end of the skid, at which time that end of the tray abruptly drops, dumping the cooked patty and heated bun halves into the basket 19, from which they may be retrieved and assembled into the finished hamburger or other item. As is now evident, the chain carries cross rod 11 around chain sprockets 5 and 5a, contact between the tray and shaft 3 cause the tray to ride up into an essentially horizontal position and the tray begins another circuit, being then ready to receive another meat patty and bun.

It has been found that by providing heated steel plates 20 along the bottom of the center compartment 201, grease drippings from the cooking patties can be caused to "flash back" or merely smoke, thus imparting a smoky flavor to the patties when done. Although auxiliary heaters are used initially to heat plates 20, the plates soon become and remain hot enough to provide continuing "flash back" or smoke without maintaining auxiliary heating.

If it is desired to made the unit self cleaning, one or more auxiliary heating elements (not shown) may be added in the lower part of the oven, while relocating the motor or providing it with suitable insulation so that when the oven is elevated to self-cleaning temperatures, the motor is not damaged.

It will now be evident that there has been described herein, an improved oven that efficaciously and economically heats hamburger buns and the like while simultaneously cooking both sides of the associated meat item using a single set of heaters and without turning over the cooked item.

Although the invention hereof has been described by way of example of a preferred embodiment, it will be evident that other adaptations and modifications may be employed without departing from the spirit and scope thereof. For example, by modifying the tray tripping mechanism, the direction of the tray travel could be reversed.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An improved oven for broiling meat patties to be installed under a serving counter comprising housing means having a front end and a rear end, heating means positioned within said housing means, and moving means positioned within said housing means for moving a generally flat food portion having two principal sides in a generally horizontal direction over said heating means from the front towards the rear of said housing to expose one of said two principal sides of said food portion to said heating means and for moving said food portion under said heating means toward the front of said housing to expose the other of said two principal sides of said food portion to said heating means while retaining said food portion in its original directional orientation, said housing further having baffle means therein for configuring a portion of said oven into a plurality of zones, one of said zones encompassing said heating means to impart a first level of cooking heat to a food portion within said one of said zones and to impart a lower level of warming heat to a food portion within others of said zones not encompassing said heating means.

2. An oven according to claim 1 wherein said first level of cooking heat is sufficient for cooking a meat food portion and said lower level of warming heat is sufficient for heating a bread product portion.

3. An oven according to claim 2 wherein said moving means includes a means for moving a meat food portion through said one of said zones for cooking said meat and simultaneously moving a bread product portion through at least one of said others of said zones for heating said bread product portion.

4. An improved oven for broiling meat patties to be installed under a serving counter comprising housing means having a front end and a rear end, heating means positioned within said housing means, and moving means positioned within said housing means for moving a generally flat food portion having two principal sides in a generally horizontal direction over said heating means from the front towards the rear of said housing means to expose one principal side of said food portion to said heating means and for moving said food portion under said heating means toward the front of said housing to expose the other principal side of said food portion to said heating means while retaining said food portion in its original directional orientation; said moving means comprising a pair of spaced parallel chains, a forward pair of spaced parallel end sprockets and a rearward pair of spaced parallel end sprockets for supporting and moving said chains; a pair of spaced parallel dual idler sprockets each of said dual sprockets comprising an inner sprocket and an outer sprocket each said outer sprocket being in rotational engagement with one of said chains, and a plurality of trays each having means at one end connected to said claims for movement of said trays and means at the other end to engage and ride on said inner sprockets.

5. An oven according to claim 4 wherein said trays each comprise a principal food portion supporting surface and at least two cross bars, and said means at one end comprises one of said cross bars of a length greater by a predetermined amount than the others of said cross bars and connected between said chains for movement of said trays by said chains.

6. An oven according to claim 5 further including slide means for providing additional support for the said other end of said trays.

7. An oven according to claim 5 wherein said dual idler sprockets are spaced forward of the rear most ones of said end sprockets by a distance essentially equal to the length of said trays and wherein the distance between the said other sprockets of said dual idler sprockets is less than the distance between said chains such that a shorter one of said at least two cross bars is carried by said other sprockets of said dual idler sprockets to a lower position as said shorter bar engages said other sprockets of said dual idler sprockets.

8. An oven according to claim 7 further including slide means for providing additional support for the said other end of said trays.

9. An oven according to claim 7 wherein said moving means further comprises an electric motor and means connecting said electric motor to said spaced forward parallel end sprockets.

10. An oven according to claim 9 further including flash-back means disposed beneath said heating means and said chains for charring any grease drippings discharged by said food portion while being cooked.

11. An improved oven especially for broiling hamburger patties and to be installed under a serving counter, comprising a main rectangular housing having a front end, a rear end, top, bottom and sides, a plurality of baffles disposed within said housing running lengthwise thereof from proximate said rear end toward said front end for dividing the interior of said oven into sections, said baffles being recessed from the front of said oven, a pair of endless chains disposed in spaced parallel relationship, one of said chains being positioned adjacent one side in the interior of said housing, and the second one of said chains being positioned adjacent the opposite side in the interior of said housing, said chains extending from a position adjacent the front end of said housing to a position adjacent the rear end of said housing, means for supporting and moving said chains in coordinated motion, the upper portion of both of said chains being disposed essentially in a first plane parallel to the bottom of said rectangular housing and being a predetermined spaced distance from the top of the interior of said housing, the lower portion of both said chains being disposed essentially in a lower plane parallel to said first plane and being a predetermined spaced distance from the bottom of the interior of said housing, a plurality of trays each having a plurality of parallel rods joined together with a plurality of cross bars to form a principal upper surface and a principal lower surface, a first one of said plurality of cross bars of each of said trays being longer than the remainder of said plurality of cross bars of said each of said trays, means for engaging said first one of said plurality of cross bars on each tray with corresponding positions on each of said pair of chains to partially support each of said tray and to impart motion thereto when said chains are in motion, a plurality of slide supports positioned a spaced predetermine distance from said sides of said interior of said housing and just below said chains, means including two of said slide supports for engaging one of said remainder of said plurality of cross bars of each of said trays to provide additional support for holding each of said trays in a generally horizontal position, an electrical heating element disposed within said housing over a portion of the length thereof and being centrally located with respect to the width of said housing, said heating element being disposed vertically between said first plane and said lower plane, means for imparting motion to said chains, and means including said chains, when moving, for moving said trays from said front end of said housing to said rear end of said housing and thence from said rear end of said housing to said front end of said housing continuously, said lower surface of said trays being exposed to said heating element by passing thereover while moving from said front end to said rear end and said upper surface of said trays being exposed to said heating element by passing thereunder while moving from said rear end to said front end.

* * * * *

UNITED STATES PATENT AND TRADEMARK OFFICE
CERTIFICATE OF CORRECTION

PATENT NO. : 4,962,695

DATED : October 16, 1990

INVENTOR(S) : Lynn L. Northrup, Jr.

It is certified that error appears in the above-identified patent and that said Letters Patent is hereby corrected as shown below:

Column 1, line 30, after "heat", second occurrence, insert -- or --;

Column 4, line 50, change "made" to -- make --.

Signed and Sealed this

Seventh Day of January, 1992

Attest:

HARRY F. MANBECK, JR.

*Attesting Officer*   *Commissioner of Patents and Trademarks*